(12) United States Patent
Vasilyev et al.

(10) Patent No.: US 8,223,070 B2
(45) Date of Patent: Jul. 17, 2012

(54) HIGH ACCURACY SATELLITE RECEIVING CONTROLLER AND ASSOCIATED METHOD

(75) Inventors: Mikhail Vasilyev, St. Petersburg (RU); Andrei Bochkovskiy, St. Petersburg (RU); Hsin-Min Peng, Hsinchu Hsien (TW); Tsai-Hsin Tsai, Hsinchu Hsien (TW); Chun-Hsien Wu, Hsinchu Hsien (TW); Ping-Hsin Kan, Hsinchu Hsien (TW); Yu Tai Chang, Hsinchu Hsien (TW); Steve Wiyi Yang, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 427 days.

(21) Appl. No.: 12/365,991

(22) Filed: Feb. 5, 2009

(65) Prior Publication Data
US 2009/0262018 A1   Oct. 22, 2009

Related U.S. Application Data

(60) Provisional application No. 61/026,148, filed on Feb. 5, 2008.

(51) Int. Cl.
*G01S 19/23* (2010.01)
*G01S 19/24* (2010.01)

(52) U.S. Cl. ............................. 342/357.62; 342/357.63
(58) Field of Classification Search ............ 342/357.62, 342/357.53
See application file for complete search history.

(56) References Cited

U.S. PATENT DOCUMENTS

| | | | | |
|---|---|---|---|---|
| 5,654,718 A * | 8/1997 | Beason et al. | ........... | 342/357.62 |
| 5,854,605 A * | 12/1998 | Gildea | ............. | 342/357.62 |
| 5,864,315 A * | 1/1999 | Welles et al. | ........... | 342/357.74 |
| 5,940,027 A * | 8/1999 | Forseth et al. | .......... | 342/357.62 |
| 7,375,681 B1 * | 5/2008 | Woo | ............. | 342/357.62 |
| 2008/0039116 A1 * | 2/2008 | Abraham | ............. | 455/456.1 |

FOREIGN PATENT DOCUMENTS
CN           1762091         4/2006
* cited by examiner

*Primary Examiner* — Gregory C Issing
(74) *Attorney, Agent, or Firm* — WPAT., P.C.; Justin King

(57) ABSTRACT

A high accuracy satellite signal receiving controller and associated method is provided. The high accuracy satellite signal receiving controller includes a frequency synthesizer, and an analog-to-digital converter (ADC), a Global Positioning System (GPS) receiving module and a control unit. The frequency synthesizer, coupled to an external non-temperature-compensated crystal oscillator (non-TXCO), generates an oscillating frequency signal to the GPS receiving module. The ADC converts an analog temperature signal into a digital temperature signal. The control unit, coupled to the ADC, adaptively updates temperature/frequency offset data.

20 Claims, 10 Drawing Sheets

HIGH ACCURACY SATELLITE RECEIVING CONTROLLER AND ASSOCIATED METHOD

CROSS REFERENCE TO RELATED PATENT APPLICATION

This patent application claims the benefit of U.S. Provisional Application No. 61/026,148, filed Feb. 5, 2008.

FIELD OF THE INVENTION

The present invention relates to a satellite receiving controller and associated method, and more particularly, to a high accuracy satellite receiving controller using a non-temperature-compensated crystal oscillator (non-TCXO) and associated method.

BACKGROUND OF THE INVENTION

The clock frequency for commercial ICs (integrated circuit) is provided by a crystal oscillator (XTAL). However, different errors occur in frequencies of clock signals provided by the XTAL due to variant temperatures. Particularly, a Global Positioning System (GPS) receiver needs an accurate clock frequency for acquisition and tracking. Referring to FIG. 1, an original relation of the temperature and the frequency offset for the XTAL is represented as a curve $S_1$. It is to be noted that, a common XTAL has a frequency variance of as high as 15 to 30 ppm (parts per million) under a temperature range of −40~85° C.

Therefore, in a high accuracy GPS receiver, a temperature-compensated crystal oscillator (TCXO) is implemented to provide compensated clock signals in conjunction with temperature change. However, a TCXO, having a frequency stability of 0.5 ppm over the operational temperature range, may cost up to many times of that of a common XTAL, i.e., a non-TCXO, thus causing addition overall costs. In the view of the aforesaid issue, there is a need of a reliable, high accurate GPS receiver that can be effectively mass produced while saving the TCXO.

SUMMARY OF THE INVENTION

Therefore, it is one objective of the invention to provide a high accuracy satellite receiving controller, an associated calibration module and an associated calibration method, with which frequency offsets of a crystal oscillator (XTAL) under different temperatures are compensated without using a temperature-compensated crystal oscillator (TCXO).

The present invention discloses a high accuracy satellite receiving controller comprising a temperature pin, a frequency synthesizer, an analog-to-digital converter (ADC), a satellite positioning system (GPS) receiving module and a control unit. The frequency synthesizer, coupled to an external non-temperature-compensated crystal oscillator (non-TCXO), generates an oscillation frequency signal to the GPS receiving module. The temperature pin, coupled to an external thermistor, receives an analog temperature signal. The ADC converts the analog temperature signal into a digital temperature signal. The control unit, coupled to the ADC, updates a temperature/frequency offset data (S-curve), which may represent a temperature/frequency offset function. Alternatively, the desired temperature/frequency offset data may be obtained by interpolating the stored temperature/frequency offset data. The control unit is coupled to the ADC and the GPS receiving module. The GPS receiving module transmits a plurality of satellite code phases and a plurality of satellite frequency offsets to the control unit. According to the satellite code phases and the satellite frequency offsets, the control unit generates an oscillation frequency adjustment value to the GPS receiving module to compensate accuracy of satellite positioning, and adaptively updates the temperature/frequency offset data. When the control unit determines that a positioning solution is absent, the control unit estimates the oscillation frequency adjustment value according to the digital temperature and the temperature/frequency offset data.

The present invention discloses a method of high accuracy satellite positioning utilizing a non-temperature-compensated oscillation signal, comprising steps of receiving a non-temperature-compensated oscillation signal, determining whether a positioning solution is present, and estimating an oscillation frequency adjustment value according to an environmental temperature and a temperature/frequency offset data.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Certain terms are used throughout the description and following claims to refer to particular components. As one skilled in the art will understand that electronic equipment manufacturers may refer to a component by different names. This specification does not intend to distinguish between components that differ in name but not function. In the following description and in the claims, the terms "include" and "comprise" are used in an open-ended fashion, and thus should be interpreted to mean "include, but not limited to".

Also, the term "couple" is intended to mean either an indirect or direct electrical connection. Accordingly, if one device is coupled to another device, that connection may be through a direct electrical connection, or through an indirect electrical connection via other devices and connections.

Figure 1:
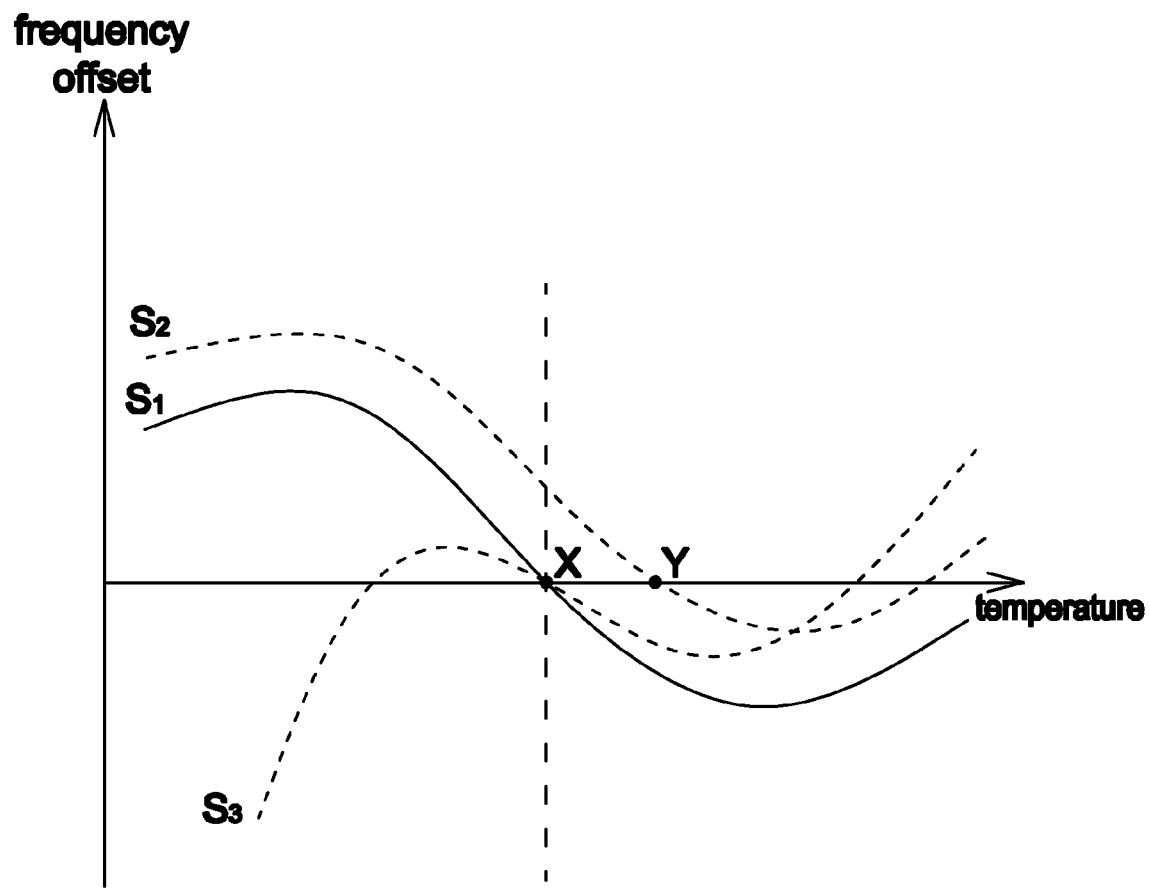
FIG. 1 is a relation diagram shows the relation of the temperature and the frequency offset of a crystal oscillator (XTAL) according to the prior art.
Figure 2:
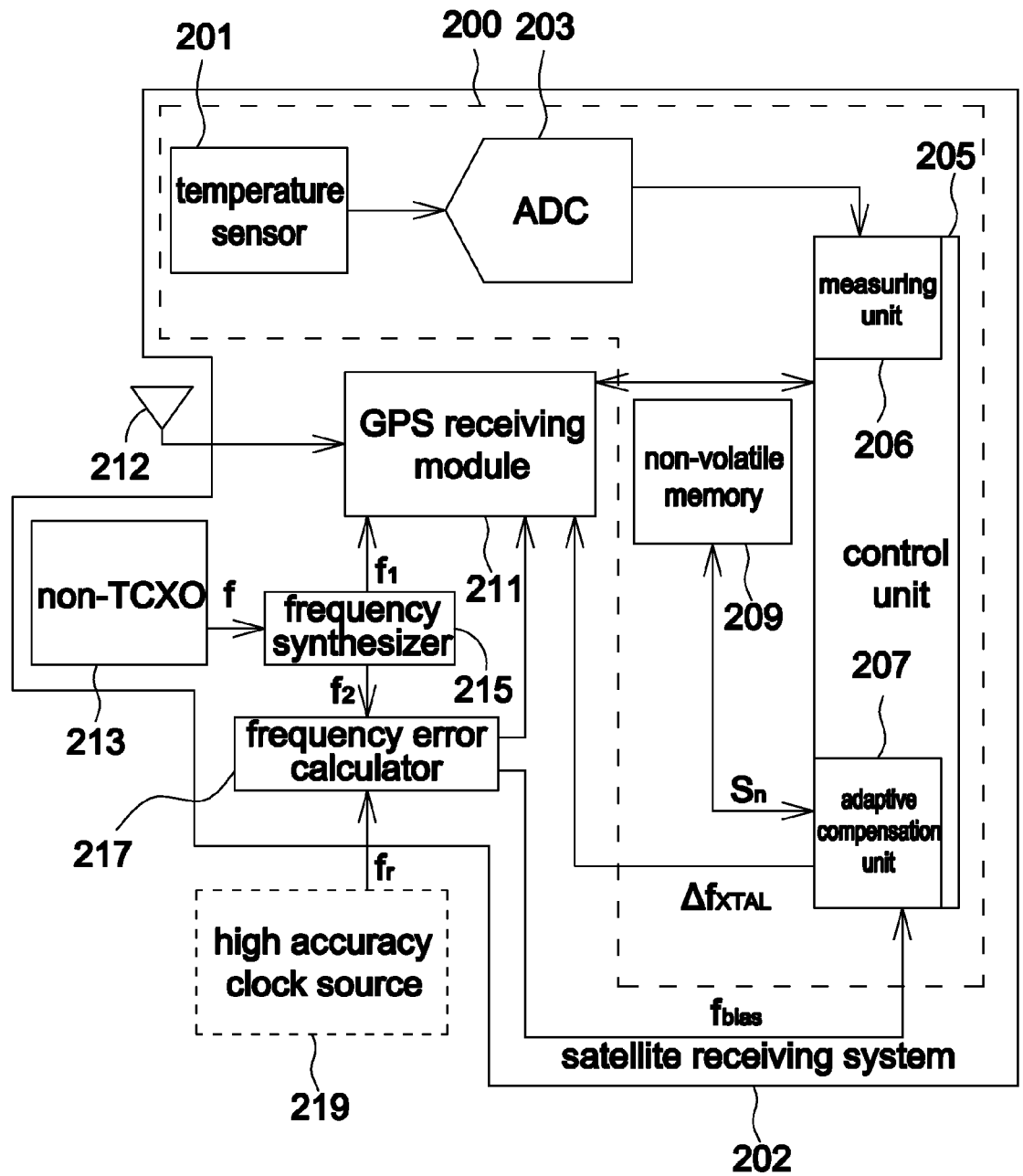
FIG. 2 is a block diagram of a satellite receiving system calibration module applying to a satellite receiving system according to one embodiment of the invention.

FIG. 2 shows a block diagram of a satellite receiving system calibration module applying to a satellite receiving system according to one embodiment of the invention. A satellite receiving system calibration module 200 comprises a temperature sensor 201, an analog-to-digital converter (ADC) 203, a control unit 205 having an adaptive compensation unit 207, a measuring unit 206, and a non-volatile memory 209. The temperature sensor 201 measures a first temperature $T_1$, which is converted into a digital output by the ADC 203. The ADC 203 may be a low cost successive approximation register ADC (SARADC). The measuring unit 206 measures characteristics of the temperature sensor 201 and the ADC 203 to generate a temperature characteristic parameter TS_CP and an ADC characteristic parameter ADC_CP, e.g., bias and slope parameters. The temperature characteristic parameter TS_CP and the ADC characteristic parameter ADC_CP are stored in the non-volatile memory 209 for subsequent processes. Further, a reference temperature/frequency offset function $S_n$, i.e., a nominal S curve, is stored in the non-volatile memory. The ADC characteristic parameter ADC_CP may include gain and bias, represented as:

$$Gain = (C2 - C1)/(Vr2 - Vr1)$$

Bias = output when input is zero;

or $$Bias = \frac{1}{N}\sum_{i=1}^{N}(c_i - gain * V_{ri}),$$

$i = 1, 2, ...$ wherein C1 and C2 are output values corresponding to inputs of Vr1 and Vr2.

In a manufacturing calibration mode, the accurate frequency of the non-TCXO 213, under the first temperature $T_1$, could be obtained by a Global Positioning System (GPS) receiving module 211 through quick acquiring to the satellites, according to satellite data (of which a method of obtaining shall be described later), time and the coarse frequency of the non-TCXO 213. In a normal training mode, upon obtaining the accurate frequency under the first temperature $T_1$, a temperature/frequency offset function $S_n$ is converged to a correct temperature/frequency offset function by utilizing the ADC characteristic parameter ADC_CP, the temperature/frequency offset function $S_n$, the accurate frequency under the first temperature $T_1$ and frequency offsets under temperatures other than the first temperature $T_1$. That is, the S-curve is updated to a correct S-curve. Also, the control unit 205 can utilize the updated temperature/frequency offset function to generate a frequency adjustment value $\Delta f_{xo}$. Detailed description on operations of the foregoing elements shall be discussed below.

When the satellite receiving system calibration module 200 is implemented in the satellite receiving system 202, the frequency adjustment value $\Delta f_{XTAL}$ is provided to the GPS receiving module 211. The GPS receiving module 211 receives satellite signals from an antenna 212, and may comprise a radio frequency (RF) pre-amplifier, an RF down converter, an intermediate frequency (IF) filter, a correlator and an accumulator. After a non-TCXO 213 generates a clock signal of a frequency f to a frequency synthesizer 215, the frequency synthesizer 215 generates clock signals of a frequency $f_1$ and a frequency $f_2$ to the GPS receiving module 211 and a frequency offset calculator 217, respectively. The frequency offset calculator 217, according to the clock signal of the frequency $f_2$, and a reference clock signal having a frequency $f_r$ from a high accuracy clock source 219, generates a frequency bias value $f_{bias}$. The frequency bias value $f_{bias}$ is directly transmitted to the control unit 205 and then stored in the non-volatile memory 209.

Figure 3:
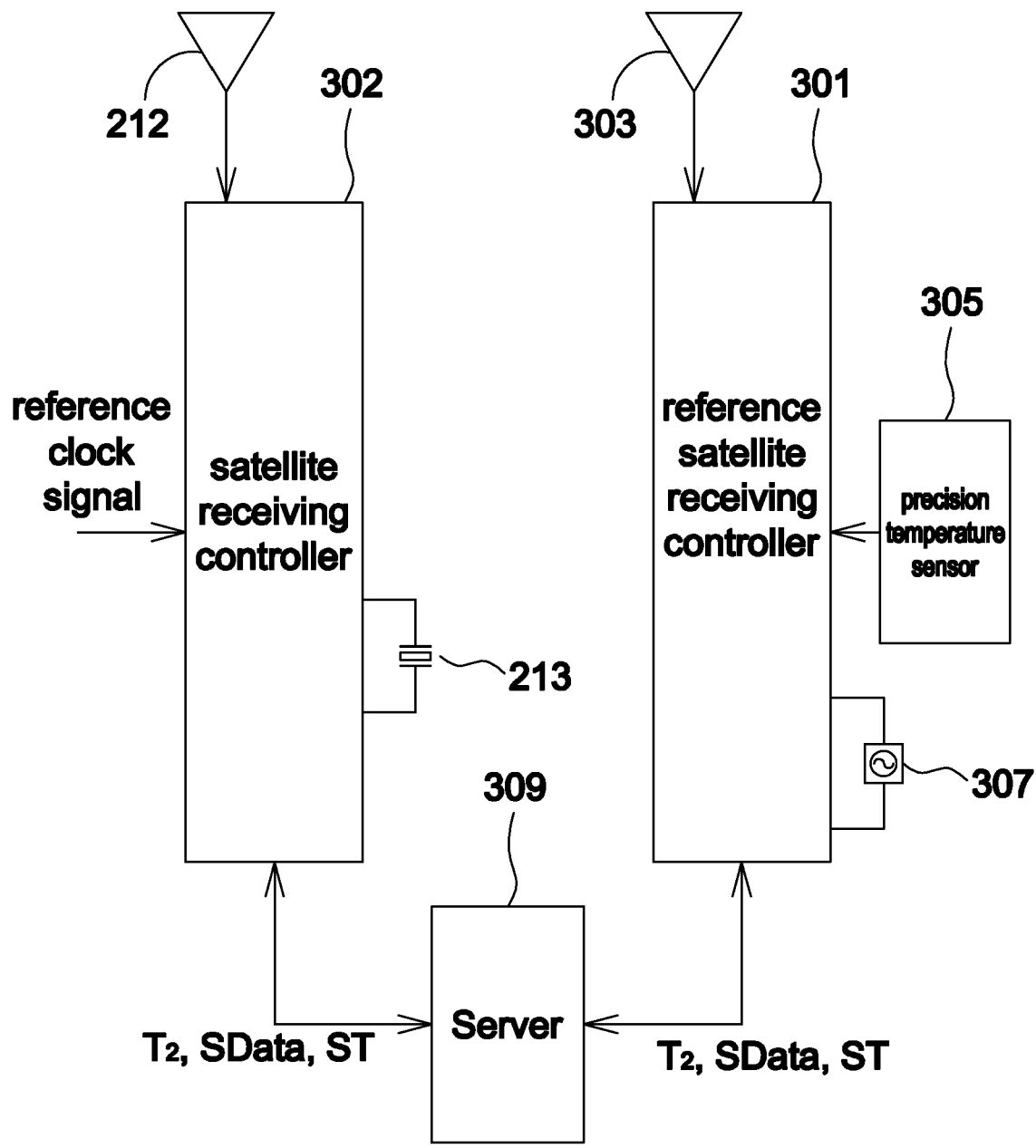
FIG. 3 is a schematic diagram showing calibration of a satellite receiving system applying a satellite receiving system calibration module according to one embodiment of the invention.

FIG. 3 shows a schematic diagram of calibration of a satellite receiving controller 302 according to one embodiment of the invention. The satellite receiving controller 302 is similar to the satellite receiving system 202 in FIG. 2, except external components, e.g. the external non-TCXO 213 and/or the non-volatile memory 209. Under a manufacturing calibration mode, the satellite receiving controller 302 is coupled to a reference satellite receiving controller 301, which is coupled to a TCXO 307. The reference satellite receiving controller 301, in coordination with the TCXO 307, operates as a high accuracy satellite receiving controller, and may be an off-the-shelf high accuracy satellite receiving system. The satellite receiving controller 302 receives a reference clock signal as a clock reference for calibration. To eliminate effects resulted from environmental changes, the reference clock signal may be provided by the high accuracy clock source 219 in FIG. 2 or the TCXO 307. The reference satellite receiving controller 301 receives a satellite signal via an antenna 303, and from the satellite signal, obtains satellite data SData and a satellite time ST from the satellite, which are fed to the satellite receiving controller 302 via a USB or UART interface, for example. According to such satellite data, the satellite receiving controller 302 could acquire to satellites quickly and obtain the accurate frequency under the first temperature $T_1$. The normalized frequency bias of the non-TCXO 213 under the first temperature $T_1$ may be represented by counter values CNT1 and CNT2 within a predetermined time period by using the reference clock signal and the clock of the non-TCXO:

Normalized frequency bias=$(CNT1-CNT2)/CNT2$

The satellite receiving controller 302 and the reference satellite signal receiving controller 301 may operate in different temperatures. For example, a precision temperature sensor 305, coupled to the satellite receiving controller 302, senses a second temperature $T_2$ of the reference satellite receiving controller 301 and transmitting the value of the second temperature $T_2$ to the satellite receiving controller 302. By referencing the second temperature $T_2$ versus the first temperature $T_1$, the satellite receiving controller 302 is capable of acquiring to satellites through the help of the frequency offset under the second temperature $T_2$. It is to be noted that, the precision temperature sensor 305 provides precise environmental temperatures to the satellite receiving controller 302 for calibration, and may be directly coupled to a server 309 and report the environmental temperature thereto. In this embodiment, the satellite receiving controller 302 and the reference satellite receiving controller 301 may be coupled to the server 309, and perform data transfer via the server 309. The server 309 may be a personal computer.

Figure 4:
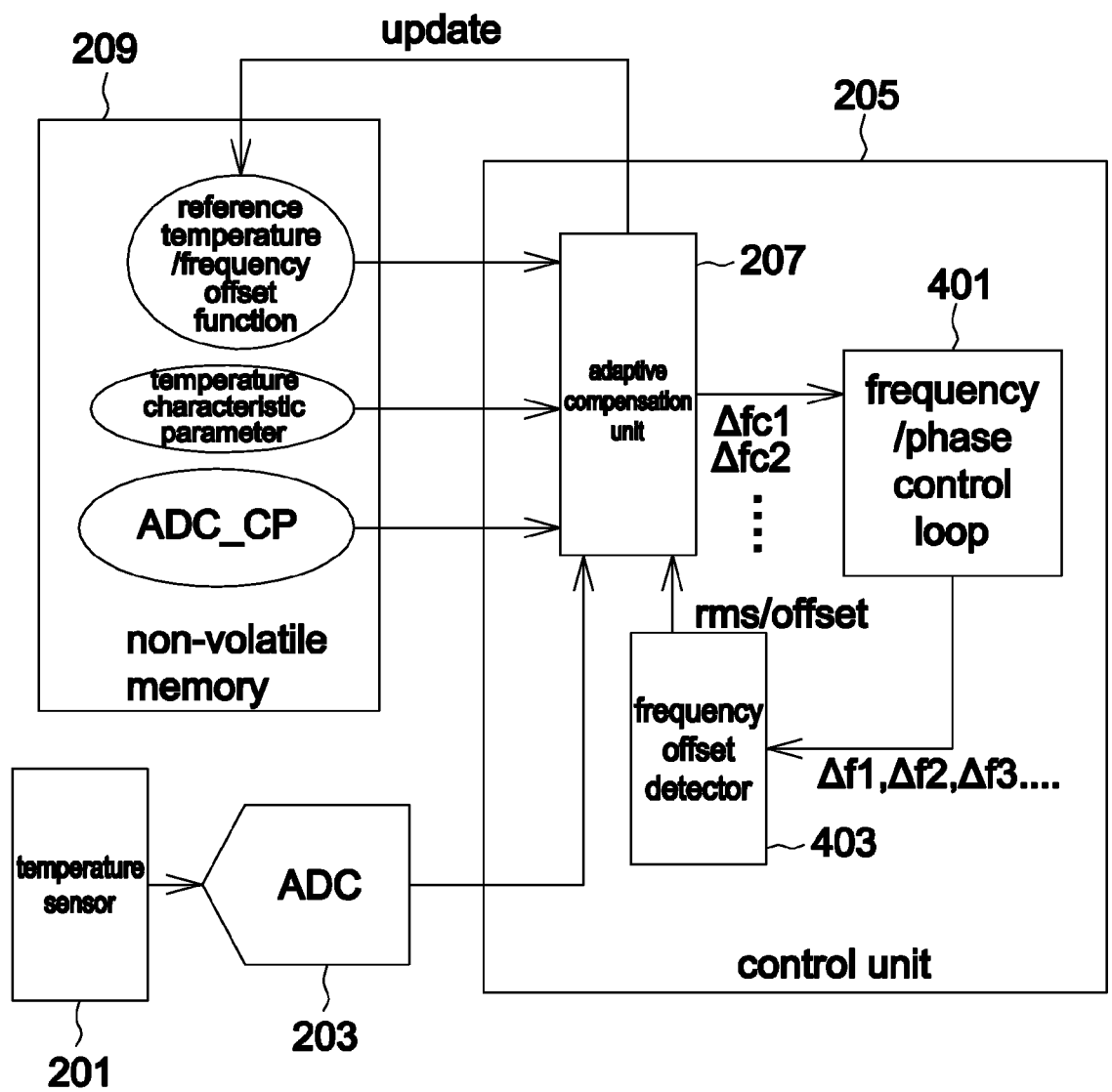
FIG. 4 is a schematic diagram showing operations of a control unit according to one embodiment of the invention.

FIG. 4 shows a schematic diagram of operation of a control unit under a normal training mode according to one embodiment of the invention. As shown, upon confirmation of the frequency offset with reference to the first temperature $T_1$, the adaptive compensation unit 207 performs a recursive filtering operation to generate a frequency calibration parameter according to the ADC characteristic parameter ADC_CP, the reference temperature/frequency offset function, the frequency bias under the first temperature $T_1$ and the frequency offset under a temperature $T_n$ distinct from the first temperature $T_1$, as well as determining an updated reference temperature/frequency function stored in the non-volatile memory 209 according to the temperature/frequency offset function. The temperature/frequency offset function, e.g., may be represented by a three-order or five-order function coefficients, or may be a plurality of calibration data, which can be interpolated when needed. The adaptive compensation unit 207 predicts estimated frequency offsets $\Delta f_{c1}$, $\Delta f_{c2}$ and $\Delta f_{c3}$ of various channels, and sends the same to a frequency/phase control loop 401. The frequency/phase control loop 401, according to the estimated frequency offsets $\Delta f_{c1}$, $\Delta f_{c2}$ and $\Delta f_{c3}$ of the various channels, generates a plurality of corresponding estimated frequency offsets $\Delta f_1$, $\Delta f_2$ and $\Delta f_3$.

A frequency offset detector 403, according to the plurality of estimated frequency offsets $\Delta f_1$, $\Delta f_2$ and $\Delta f_3$, generates a frequency offset parameter and a reliability parameter rms. Based on the frequency offset parameter and the reliability parameter rms, the adaptive compensation unit 207 then determines whether to update the temperature/frequency offset function according to the frequency calibration parameter. The foregoing $T_n$ is a temperature distinct from the first temperature $T_1$, and the adaptive compensation unit 207 adaptively updates the reference temperature/frequency offset function each time there is a different $T_n$. Therefore, being provided with more different temperature $T_n$, the temperature/frequency offset function, that is, the S-curve, is updated approximate to the reality. The adaptive compensation unit 207 may determine whether to update the reference temperature/frequency offset parameter according to at least one condition below:

1. whether the frequency calibration parameter falls within a predetermined range; e.g., the frequency calibration parameter is not updated when falling outside of the predetermined range;
2. whether the temperature $T_n$ falls within a predetermined range; e.g., the frequency calibration parameter is not reliable when the temperature $T_n$ falls outside of the predetermined temperature range;
3. whether the temperature/frequency offset function is being updated at a frequency within a predetermined updating interval; e.g., the frequency calibration parameter is not updated when being updated more frequently than the predetermined updating interval; and
4. whether to update the reference temperature/frequency offset function according to a difference between two $T_n$ measured.

The adaptive compensation unit 207 performs recursive filtering, which can estimate the status of a dynamic system among data that are incomplete or contain noises. In this embodiment, the adaptive compensation unit 207 can be implemented by a Kalman filter. Via recursive filtering, the S-curve is converged. Thus, along with increase in time and reference data, relationship between the frequency offset and temperature is converged to yield better compensation accuracy.

Although, in the foregoing embodiments, block diagrams are used for describing the satellite receiving controller calibration module according to the embodiments of the invention, it is to be understood that not all the elements in the foregoing embodiments are necessarily realized using hardware. For example, the control unit 205 may be a built-in microprocessor operating on corresponding software to realize the operations of the above embodiments.

Figure 5:
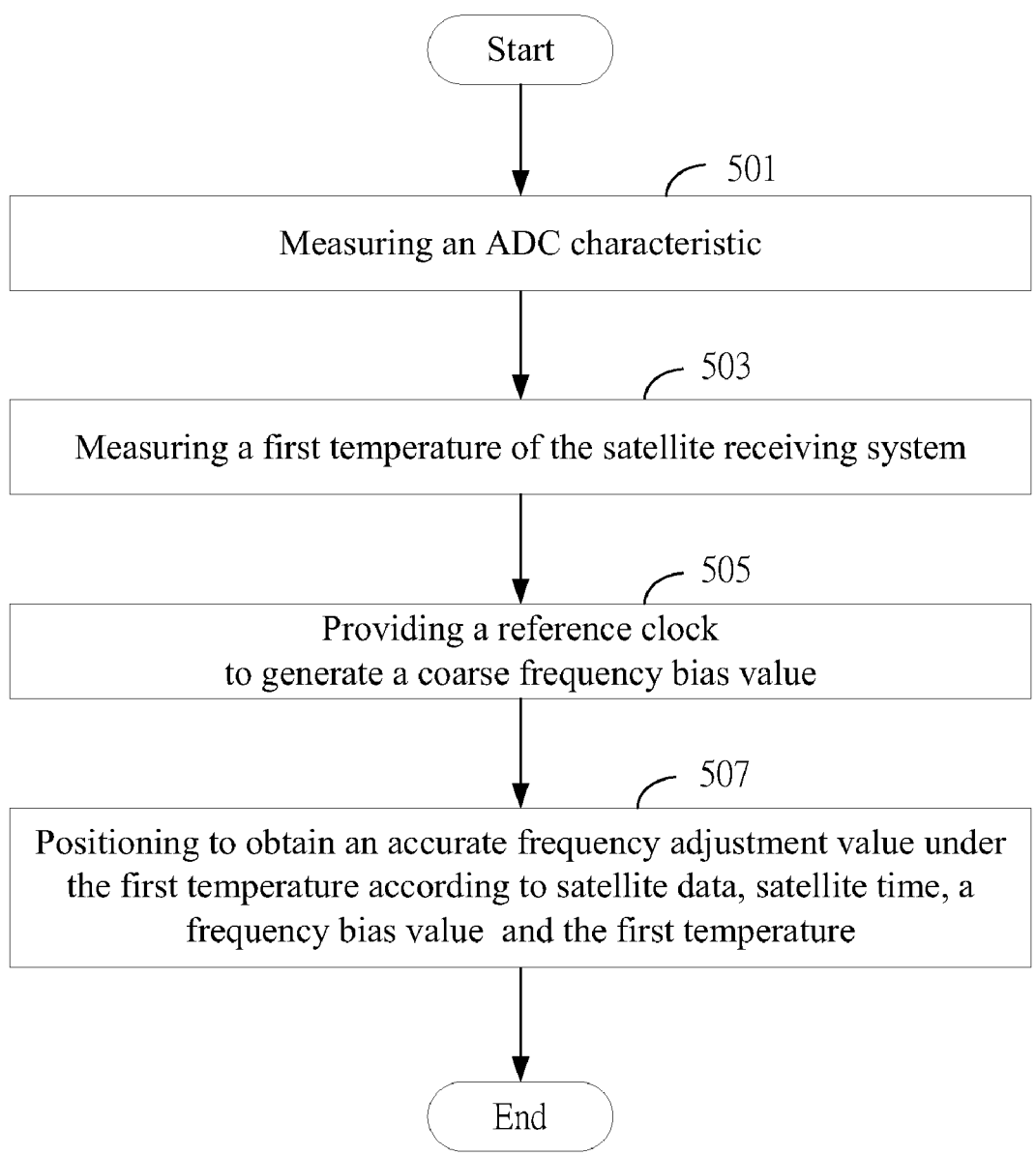
FIG. 5 is a calibration method of a satellite receiving system in a manufacturing calibration mode according to one embodiment of the invention.

FIG. 5 shows a method for calibrating a satellite receiving system in a manufacturing calibration mode according to one embodiment of the invention. In Step 501, an ADC characteristic of the satellite receiving system is measured to generate an ADC characteristic parameter. In Step 503, a first temperature of the satellite receiving system is measured; alternatively, it may be regarded as a temperature of the ADC is measured, to generate a temperature characteristic parameter, such as a temperature bias measured by a temperature sensor. In Step 505, a reference clock is provided to generate a coarse frequency bias value. In Step 507, according to satellite data, satellite time, a frequency bias value of an oscillator in the satellite receiving system and the first temperature, perform positioning to obtain an accurate frequency adjustment value under the first temperature.

Figure 6:
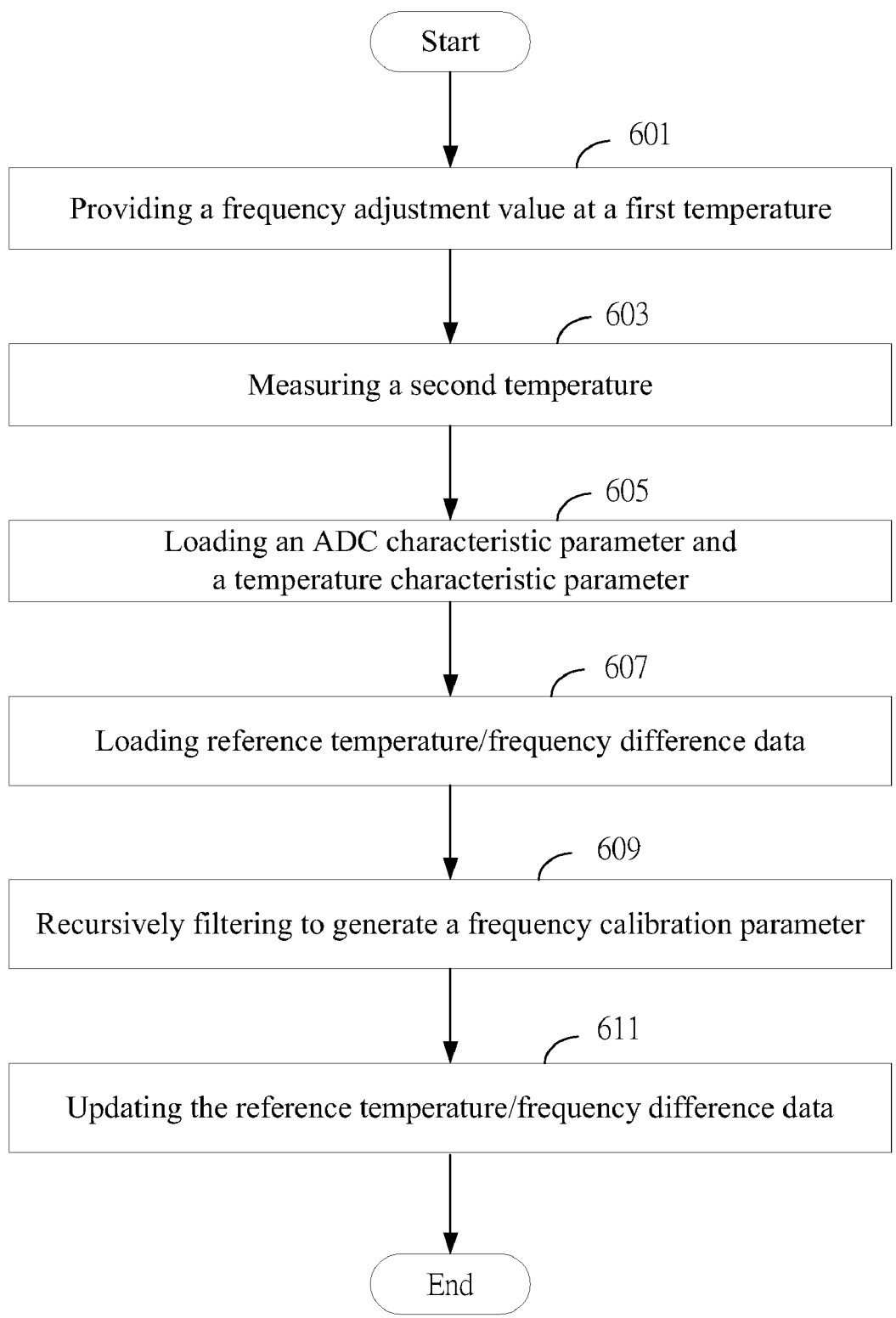
FIG. 6 is a calibration method of a satellite receiving system in a normal training mode according to one embodiment of the invention.

FIG. 6 shows a method for calibrating a satellite receiving system in a normal training mode according to one embodiment of the invention. In Step 601, a frequency adjustment value of a satellite receiving system under test at a first temperature is provided. For example, applying the method for calibrating the satellite receiving system shown in FIG. 5, a frequency adjustment value is obtained. In Step 603, a second temperature of the calibration receiving system is measured. In Step 605, an ADC characteristic parameter of an ADC of the satellite receiving system and a temperature characteristic parameter are loaded. In Step 607, reference temperature/frequency offset data, e.g. the function representing reference temperature/frequency offset, are loaded. In Step 609, according to the satellite data, frequency bias value of the oscillator, ADC characteristic parameter, reference temperature/frequency offset parameter, frequency adjustment value under the first temperature and the second temperature, a recursive filtering is performed to generate a frequency calibration parameter. In Step 611, according to the frequency calibration parameter, the reference temperature/frequency offset data is updated.

Figure 7:
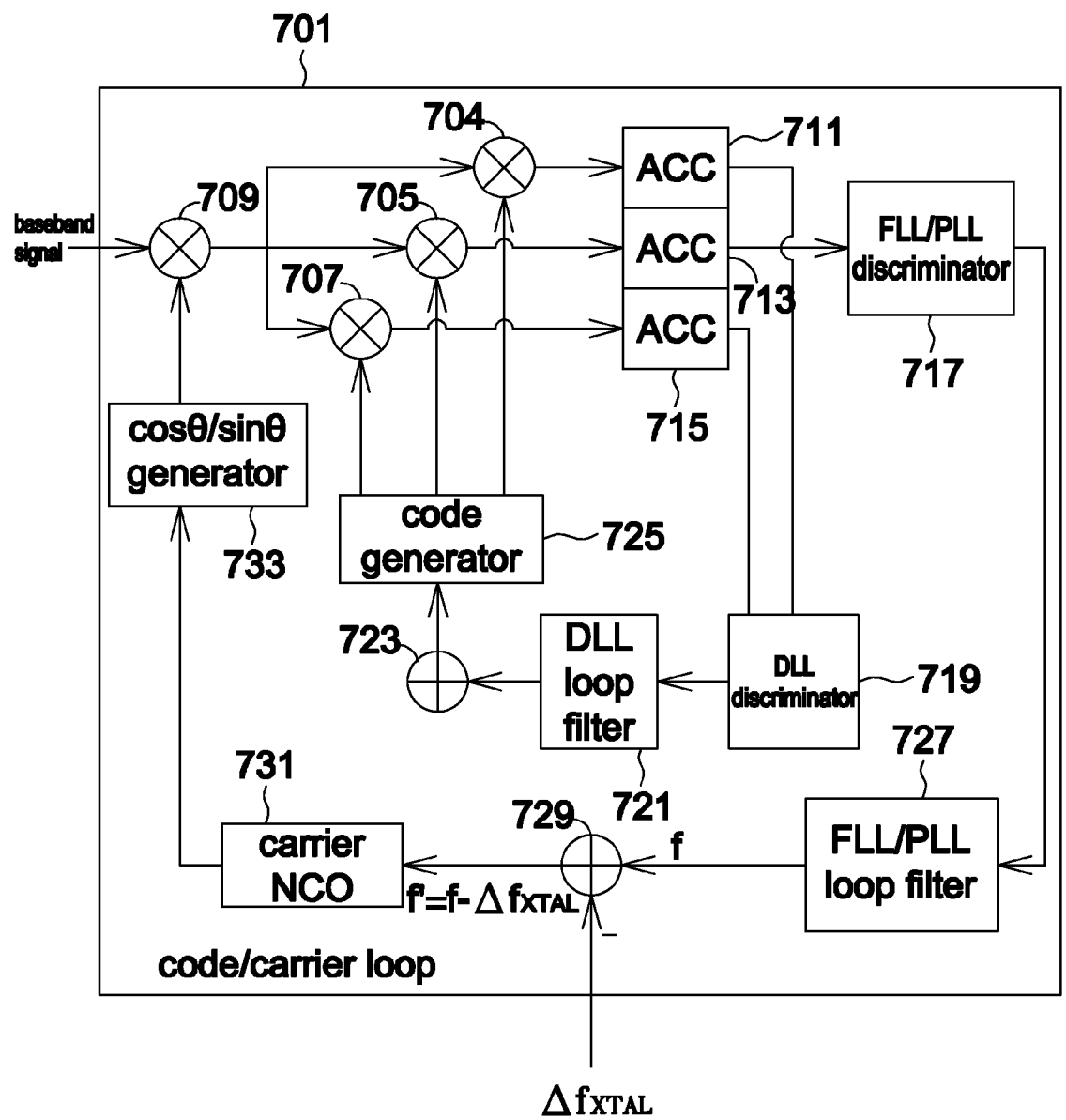
FIG. 7 is a schematic diagram of a frequency adjustment value $\Delta f_{XTAL}$ being implemented in a satellite receiving system upon obtaining the frequency adjustment value $\Delta f_{XTAL}$ by the satellite receiving system calibration module according to one embodiment of the invention.

FIG. 7 shows a schematic diagram of a frequency adjustment value $\Delta f_{XTAL}$ being implemented to a code/carrier loop 701 in a satellite receiving system according to one embodiment of the invention. The code/carrier loop 701 receives a baseband signal to compensate such as time delay, carrier frequency offset and phase error. The code/carrier loop 701 comprises correlators 704, 705, 707 and 709, accumulators 711, 713, 715, an FLL/PLL discriminator 717, a DLL discriminator 719, a DLL loop filter 721, adders 723 and 729, a code generator 725, an FLL/PLL loop filter 727, a carrier numerical control oscillator (NCO) 731, and a sin θ/cos θ generator 733. It is to be noted that, the foregoing elements are for illustrative purposes on implementation of the frequency adjustment value $\Delta f_{XTAL}$ but not to be limiting on the scope of the invention. The frequency adjustment value $\Delta f_{XTAL}$ generated according to the aforesaid embodiment is subtracted by a Doppler frequency f and further transmitted to the carrier NCO 731 for subsequent compensation operations.

Figure 8:
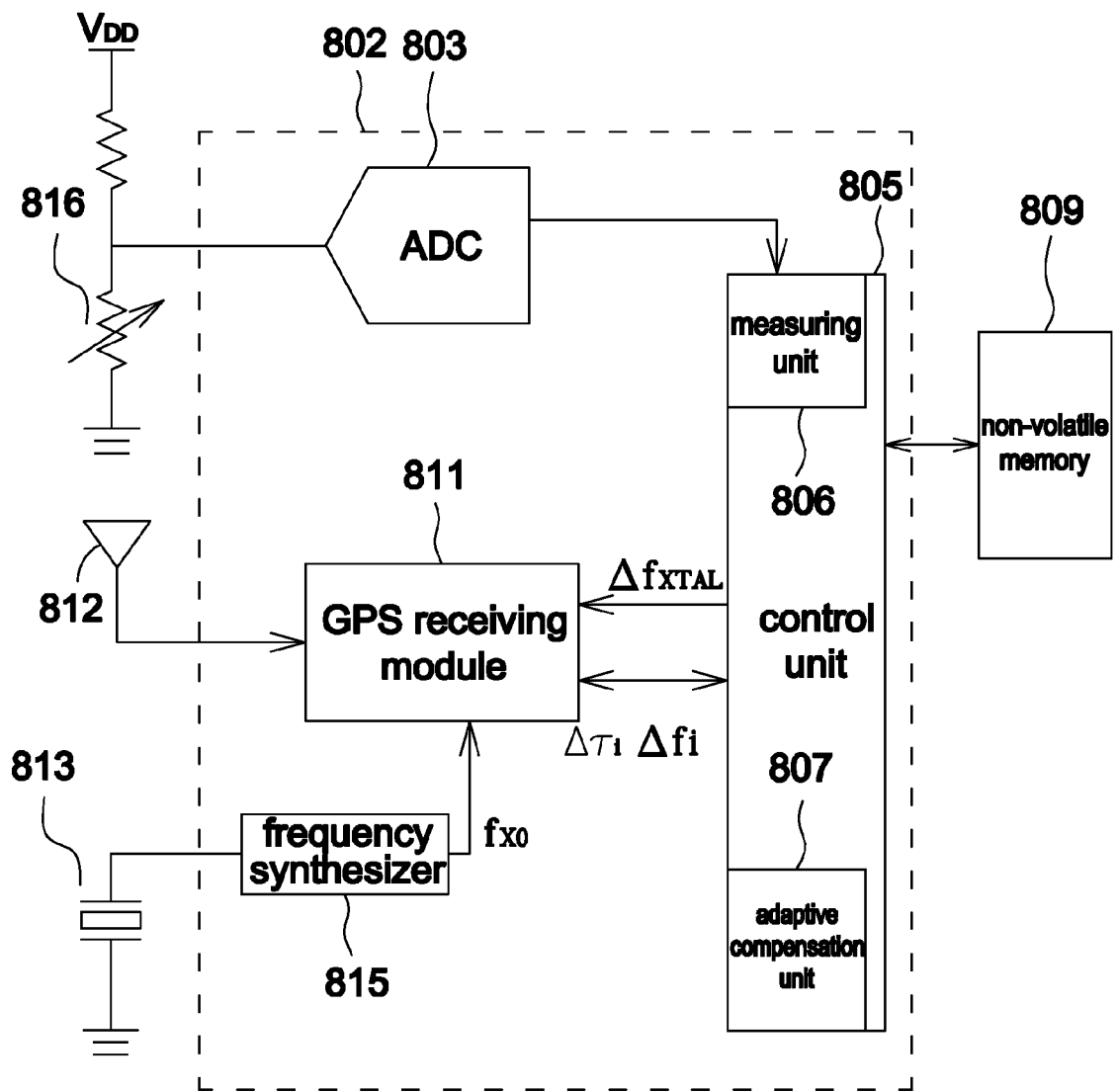
FIG. 8 shows a block diagram of a satellite receiving system illustrating a search range during positioning in a normal training mode according to one embodiment of the invention.

FIG. 8 shows a block diagram of a satellite receiving system according to one embodiment of the invention. The satellite receiving controller 802 comprises an ADC 803, a control unit 805, a GPS receiving module 811 and a frequency synthesizer 815. The ADC 803 is coupled to an external thermistor 816. The thermistor 816 generates an accurate analog temperature signal, which is then converted into a digital temperature by the ADC 803, e.g. a low cost SARADC. The GPS receiving module 811 is coupled to an external antenna 812, for receiving a plurality of satellite signals. The satellite receiving controller 802 is coupled to a non-TCXO 813. The frequency synthesizer 815 is coupled to the non-TCXO and generates an oscillation signal $f_{xo}$ for operations of the GPS receiving module 811.

Under the structure described, although the thermistor 816 is introduced, convenience is rendered for mass production, so that the testing system and flow in FIG. 3 can be reduced. For example, the high accurate clocks source 219 could be saved during calibration procedure of mass production. The course frequency of non-TCXO 813 could be obtained by acquiring to satellites if full possible range is scanned for non-TCXO 813. The satellite receiving controller 802 is coupled to the non-volatile memory 809, e.g., a flash memory. The control unit 805 comprises a measuring unit 806 and an adaptive compensation unit 807. The ADC 803 and the measuring unit 806 measure the digital temperature. The adaptive compensation unit 807 adaptively compensates frequency offsets of oscillation signals generated by the non-TCXO 813. It is to be noted that, the satellite receiving controller 802 is coupled to the foregoing external components via independent pins. The non-volatile memory 809 stores the ADC calibration parameter and the temperature/frequency offset function. The control unit 805, by updating temperature/frequency offset function, facilitates the satellite receiving controller 802 to improve accuracy as well as shortening the power on period of each restart.

Figure 9:
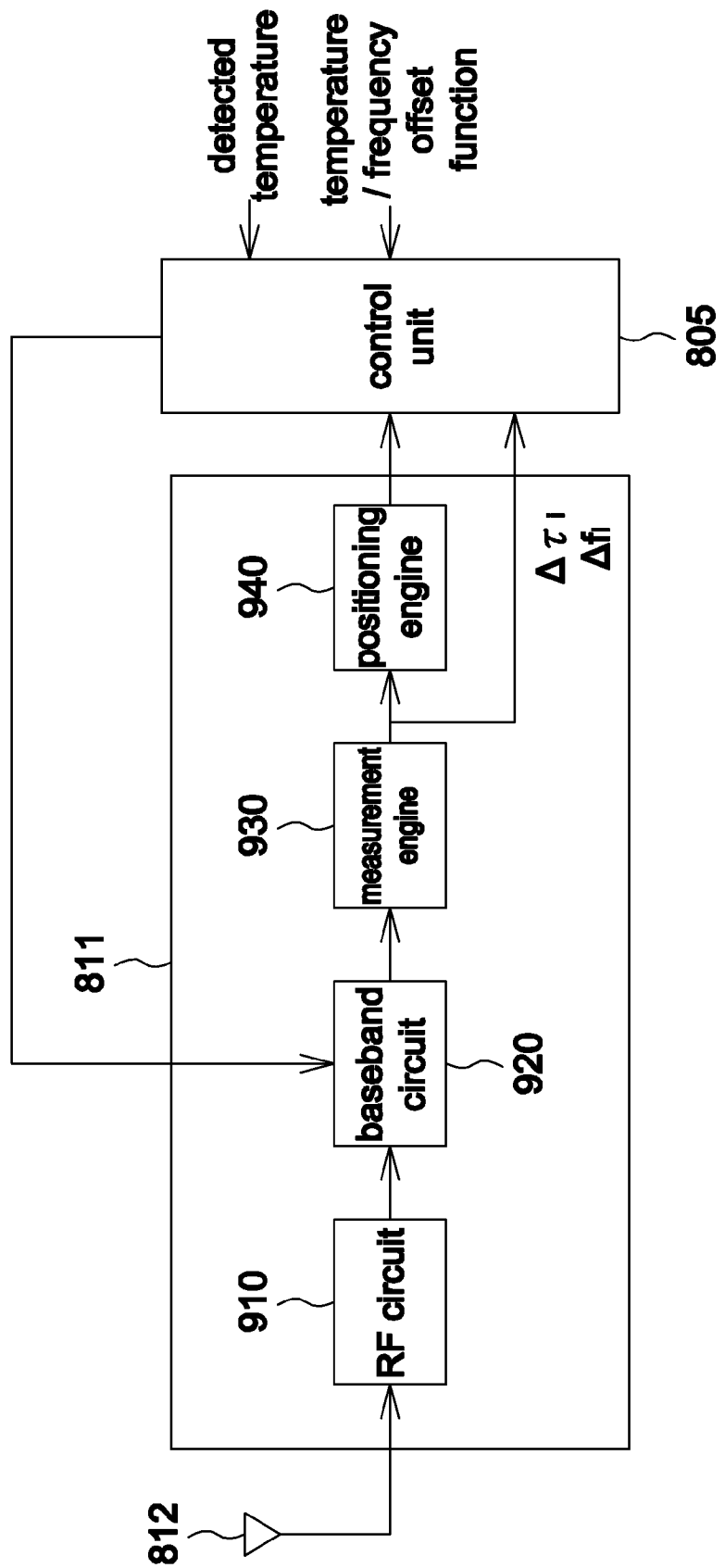
FIG. 9 is a satellite receiving controller according to one embodiment of the invention.

FIG. 9 shows an operational block diagram of the GPS receiving module 811 and the control unit 805 in FIG. 8 according to one embodiment of the invention. The GPS receiving module 811 comprises an RF circuit 910, a baseband circuit 920, a measurement engine (ME) 930, and a positioning engine (PE) 940. The control unit 805 provides an oscillation frequency adjustment value $\Delta f_{XTAL}$ to the baseband circuit 920 for compensation on the code bin and the frequency bin. The PE 940 sends out a positioning result. The ME 930 transmits a plurality of satellite code phase errors $\Delta T_i$, and a plurality of satellite frequency offsets $\Delta f_i$ to the control unit 805. When the GPS receiving module 811 receives satellite signals normally, i.e. satellite signals being present and strong, the control unit 805 generates the oscillator frequency adjustment value $\Delta f_{XTAL}$ according to the satellite frequency offset $\Delta f_i$ and the satellite code phase error $\Delta T_i$. When the control unit 805 determines that a positioning solution is absent according to the satellite frequency offset $\Delta f_i$ and the satellite code phase error $\Delta T_i$, the control unit 805, based on a detected temperature, e.g., as shown in FIG. 8, and a temperature/frequency offset function, estimates the frequency offset $\Delta f_i$ for the baseband circuit 920 to compensate the code bin and the frequency bin, thereby maintaining high accuracy satellite positioning of the satellite positioning system.

Figure 10:
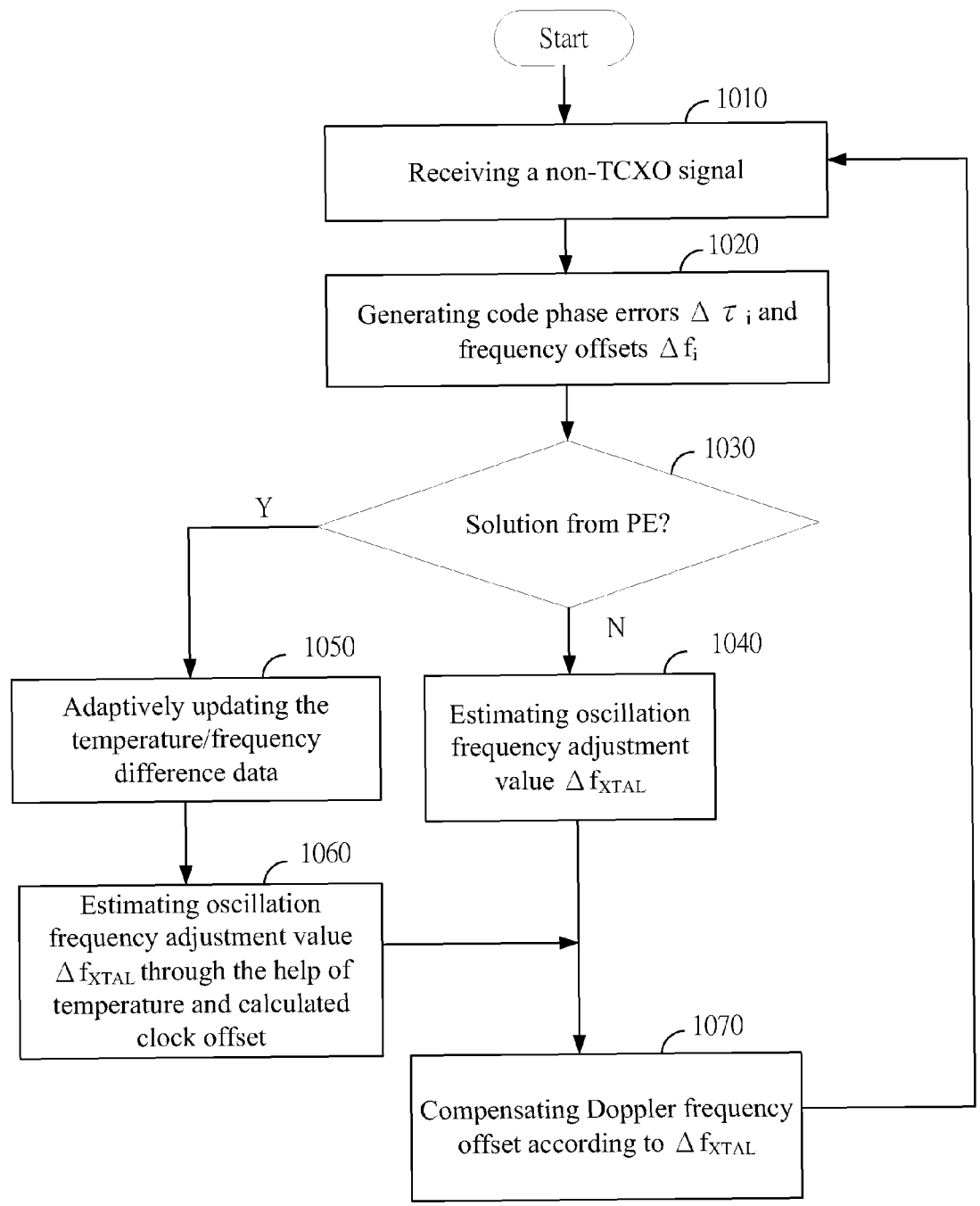
FIG. 10 is an operational block diagram between the GPS receiving module and the control unit in FIG. 9.

FIG. 10 shows a flowchart of a high accuracy satellite positioning method utilizing a non-TCXO signal according to one embodiment of the invention. In Step 1010, a non-TCXO signal is received. In Step 1020, a plurality of satellite code phase errors $\Delta T_i$ and satellite frequency offsets $\Delta f_i$ are generated. In Step 1030, it is determined whether a positioning solution, e.g. by positioning engine (PE) 940 in FIG. 9, is generated according to the satellite code phase errors $\Delta T_i$ and satellite frequency offsets $\Delta f_i$. If the positioning solution is present, Step 1050 is performed to adaptively update the temperature/frequency offset data, e.g. utilizing a Kalman filter. In Step 1060, the oscillation frequency adjustment value $\Delta f_{XTAL}$ is estimated through the help of temperature and calculated clock offset, e.g. from GPS receiving module 811 in FIG. 9. If the positioning solution is absent, Step 1040 is performed to estimate the oscillation frequency adjustment value $\Delta f_{XTAL}$ according to temperature and data stored in the flash memory. In Step 1070, Doppler frequency offset is compensated according to the oscillation frequency adjustment value $\Delta f_{XTAL}$.

The invention discloses a high accuracy satellite receiving controller comprising a temperature pin, a frequency synthesizer, an ADC, a GPS receiving module and a control unit. The frequency synthesizer, coupled to an external non-TCXO, generates an oscillation frequency signal to the GPS receiving module. The temperature pin, coupled to an external thermistor, receives an analog temperature signal. The ADC converts an analog temperature into a digital temperature. The control unit, coupled to the ADC, updates temperature/frequency offset data according to the digital temperature. The temperature/frequency offset data may represent a temperature/frequency function, or the required temperature/frequency offset data can be obtained by interpolation. The control unit is coupled to the ADC and the GPS receiving module. The GPS receiving module transmits a plurality of satellite code phase errors and a plurality of satellite frequency offsets to the control unit. According to the satellite code phase errors and the satellite frequency offsets, the control unit generates an oscillation frequency adjustment value to the GPS receiving module to compensate accuracy of satellite positioning and to facilitate the control unit to adaptively update a temperature/frequency offset data according to the digital temperature. When the control unit determines that a positioning solution is absent, the control unit estimates the oscillation frequency adjustment value according to the digital temperature and the temperature/frequency offset data, e.g. stored in the flash memory.

The invention further discloses method of high accuracy global positioning using a non-temperature-compensated oscillation signal. The method comprises steps of receiving a non-temperature-compensated oscillation frequency, determining whether a positioning solution is present, estimating an oscillation frequency adjustment value according to an environmental temperature and a temperature/frequency offset data, and adaptively updating utilizing a Kalman filter.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A high accuracy satellite receiving controller, comprising:
   an analog-to-digital converter (ADC), for receiving an analog temperature and converting the same into a digital temperature;
   a global positioning system (GPS) receiving module, for performing satellite positioning;
   a non-volatile memory, for storing a temperature/frequency offset data;
   a frequency synthesizer, coupled to an external non-temperature-compensated crystal oscillator (non-TCXO), for generating clock signals and an oscillating frequency signal for operating the GPS receiving module; and
   a control unit, coupled to the ADC and the GPS receiving module;
   wherein, the control unit generates an oscillation frequency adjustment value according to the stored temperature/frequency offset data, satellite frequency offset data, and satellite code phase error data, sends the oscillation frequency adjustment value to the GPS receiving module to compensate accuracy of satellite positioning, and adaptively updates the stored temperature/frequency offset data.

2. The high accuracy satellite receiving controller as claimed in claim 1, wherein the temperature/frequency offset data represents a temperature/frequency offset function.

3. The high accuracy satellite receiving controller as claimed in claim 1, wherein the GPS receiving module transmits a plurality of satellite code phase errors and a plurality of satellite frequency offsets to the control unit.

4. The high accuracy satellite receiving controller as claimed in claim 3, wherein when the control unit determines that a positioning solution is absent, the control unit estimates the oscillation frequency adjustment value according to the digital temperature and the temperature/frequency offset data.

5. The high accuracy satellite receiving controller as claimed in claim 1, further comprising a reference clock pin for receiving an accurate reference clock for calibrating the controller.

6. The high accuracy satellite receiving controller as claimed in claim 1, further comprising a temperature sensor for detecting an environmental temperature to generate the analog temperature.

7. The high accuracy satellite receiving controller as claimed in claim 1, further comprising a temperature pin for coupling to an external thermistor to generate the analog temperature.

8. The high accuracy satellite receiving controller as claimed in claim 1, wherein the control unit is coupled to an external non-volatile memory.

9. The high accuracy satellite receiving controller as claimed in claim 8, wherein the non-volatile memory is a flash memory.

10. The high accuracy satellite receiving controller as claimed in claim 1, wherein the GPS receiving module comprises a radio frequency (RF) circuit, a baseband circuit, a measurement engine and a positioning engine; the baseband circuit receives the oscillation frequency adjustment value to compensate accuracy of satellite positioning.

11. The high accuracy satellite receiving controller as claimed in claim 1, wherein the control unit comprises a Kalman filter for adaptively updating the temperature/frequency offset data.

12. The high accuracy satellite receiving controller as claimed in claim 1, a frequency bias of the non-TCXO is stored in an external non-volatile memory.

13. A method of high accuracy satellite positioning utilizing a non-temperature-compensated oscillation signal, comprising steps of:
receiving the non-temperature-compensated oscillation signal;
determining a temperature/frequency offset data;
determining whether a positioning solution is present or absent;
adaptively updating the temperature/frequency offset data and estimating an oscillation frequency adjustment value according to a calculated clock offset and the temperature/frequency offset data when the positioning solution is present; and
estimating an oscillation frequency adjustment value according to an environmental temperature and the temperature/frequency offset data when the positioning solution is absent.

14. The method as claimed in claim 13, wherein the temperature/frequency offset data represents a temperature/frequency offset function.

15. The method as claimed in claim 13, further comprising a step of generating a plurality of satellite code phase errors and a plurality of satellite frequency offsets.

16. The method as claimed in claim 15, wherein the determining step determines whether a positioning solution is present according to the satellite code phase errors and the satellite frequency offsets.

17. The method as claimed in claim 13, further comprising a step of compensating a Doppler frequency offset according to the oscillation frequency adjustment value.

18. The method as claimed in claim 13, further comprising a step of adaptively updates the temperature/frequency offset data utilizing a Kalman filter.

19. The method as claimed in claim 13, wherein the temperature/frequency offset data is stored in an external non-volatile memory.

20. The method as claimed in claim 19, wherein a frequency bias of a non-temperature-compensated oscillator is stored in the non-volatile memory.

* * * * *